US009698633B2

(12) United States Patent
Lenz et al.

(10) Patent No.: US 9,698,633 B2
(45) Date of Patent: Jul. 4, 2017

(54) ELECTROMECHANICAL TRANSDUCER (71) Applicant: LEANTEC MOTOR GMBH, Saalfeld (DE)

(72) Inventors: Rainer Lenz, Hamburg (DE); Torsten Keller, Saalfeld (DE); Sven Schmidt, Werdau (DE); Thomas Bartsch, Lichtenstein (DE); Philip Hennig, Lutherstadt Wittenberg (DE); Erik Braune, Zwickau (DE); Maik Hohmuth, Altenburg (DE)

(73) Assignee: Leantec Motor GmbH, Saalfeld (DE)

( * ) Notice: Subject to any disclaimer, the term of this patent is extended or adjusted under 35 U.S.C. 154(b) by 306 days.

(21) Appl. No.: 14/424,547

(22) PCT Filed: Aug. 30, 2013

(86) PCT No.: PCT/IB2013/058154
§ 371 (c)(1),
(2) Date: Feb. 27, 2015

(87) PCT Pub. No.: WO2014/033677
PCT Pub. Date: Mar. 6, 2014

(65) Prior Publication Data
US 2015/0214789 A1 Jul. 30, 2015

(30) Foreign Application Priority Data

Aug. 31, 2012 (DE) .................. 10 2012 108 099

(51) Int. Cl.
*H02K 1/14* (2006.01)
*H02K 1/27* (2006.01)
(Continued)

(52) U.S. Cl.
CPC ........... *H02K 1/145* (2013.01); *H02K 1/2793* (2013.01); *H02K 16/00* (2013.01); *H02K 21/24* (2013.01); *H02K 2201/12* (2013.01)

(58) Field of Classification Search
CPC ...... H02K 1/182; H02K 1/2793; H02K 1/145; H02K 21/026; H02K 16/00–16/04
(Continued)

(56) References Cited

U.S. PATENT DOCUMENTS

| 4,283,646 A | 8/1981 | Hansen et al. |
| 6,507,258 B1 * | 1/2003 | Sadler ............ H02K 7/14 |
| | | 310/257 |

(Continued)

FOREIGN PATENT DOCUMENTS

| AT | 505839 A1 | 4/2009 |
| DE | 2913691 A1 | 10/1980 |

(Continued)

Primary Examiner — Thomas Truong
(74) Attorney, Agent, or Firm — Laurence A. Greenberg; Werner H. Stemer; Ralph E. Locher (57) ABSTRACT

A transducer contains a rotor, on which permanent magnets are arranged in a concentrically radiant manner, and two stators are provided at both sides of the rotor. The stators are produced from a soft-magnetic material. Each stator contains a first stator section with radially outer supporting bars for first magnetic active faces of the stator being opposite the rotor and a second stator section with radial inner supporting bars for second magnetic active faces of the stators being opposite the rotor. An annular winding groove for receiving a winding is provided between the stator sections. Supporting bars are each arranged in an annular manner and each extend parallel to the rotor axis in the direction of the rotor. The magnetic active faces of the stators are end faces of (Continued)

projections which are uniformly spaced to one another and which protrude from the supporting bars in the direction of the rotor.

15 Claims, 7 Drawing Sheets

(51) Int. Cl.
*H02K 16/00* (2006.01)
*H02K 21/24* (2006.01)

(58) Field of Classification Search
USPC ............ 310/156.32, 112, 114, 266, 268, 257
See application file for complete search history.

(56) References Cited

U.S. PATENT DOCUMENTS

| | | | |
|---|---|---|---|
| 6,531,799 B1 * | 3/2003 | Miller | H02K 21/24 |
| | | | 310/112 |
| 7,205,698 B2 | 4/2007 | Haydock et al. | |
| 2011/0057532 A1 * | 3/2011 | Marquardt | H02K 1/2793 |
| | | | 310/156.35 |
| 2012/0119599 A1 | 5/2012 | Calley et al. | |

FOREIGN PATENT DOCUMENTS

| | | |
|---|---|---|
| DE | 29814964 U1 | 12/1998 |
| DE | 10322474 A1 | 12/2004 |
| EP | 2255431 A1 | 12/2010 |
| WO | 02056443 A2 | 7/2002 |

\* cited by examiner

ELECTROMECHANICAL TRANSDUCER

BACKGROUND OF THE INVENTION

Field of the Invention

The present invention relates to an electromechanical transducer comprising at least one disk-shaped or annular rotor, in and/or on which permanent magnets are arranged in a concentrically radiant manner, and at least two stators provided at both sides of the rotor, wherein the stators are at least partially produced of soft-magnetic material; each stator comprises a first stator section with radially outer supporting bars for first magnetic active faces of the stator being opposite the rotor and a second stator section with radial inner supporting bars for second magnetic active faces of the stators being opposite the rotor; an annular winding groove for receiving at least one winding is provided between said stator sections; the supporting bars are each arranged in an annular manner and each extend parallel to the rotor axis in the direction of the rotor; the magnetic active faces of the stators are end faces of projections which are uniformly spaced to one another and which protrude from the supporting bars in the direction of the rotor; the projections which are provided on the radially outer supporting bars, respectively, are offset angularly to the projections, which are provided on the radially inner supporting bars, respectively, in respect of the projection spacing, by half a pitch, and, in the case of at least one of the stators, the projections which are provided on the radially outer supporting bars and/or the projections which are provided on the radially inner supporting bars extend at least partially above the winding groove with a radial orientation, so that the winding groove is formed between stator backs which hold the supporting bars, the supporting bars and the projections, and wherein an air gap, which extends parallel to the circumferential direction of the rotor is provided between the projections, respectively.

The document EP 2 255 431 B1 describes an electromechanical transducer, having non-ferrous disk-shaped rotors, which carry permanent magnets arranged in a concentric circle in a single row. Annular stators are provided at both sides of the rotor-disks. The sides of the stators, being opposite the rotor, comprise radially grooved inner and outer boundary surfaces. Said boundary surfaces are arranged, with respect to the groove pitch, in an angular offset by half a pitch to one another. In addition, the radially outer and the radially inner boundary surfaces are separated by a circumferential annular groove. The annular groove comprises windings which are electrically contacted with a rectified polarity at the stators provided at both sides of the rotor.

The rotors are of a non-ferrous, non-magnetic material and provided with permanent magnets such that the connecting line of the magnetic north and south poles of the permanent magnets points in circumferential direction and adjacent permanent magnets repel each other.

The known direct drive is characterized by an axially short overall length and high torque uniformity at high specific torques. Nonetheless, the relatively complex manufacturing technology is problematic, at which the single permanent magnets have to be adequately fixed to the rotor. Furthermore, the efficiency of the known direct drive is not optimal as the usage of non-ferrous permanent magnets is of disadvantage here causing a lower power density.

The document DE 29 13 691 A1 describes an electric motor, having eight approximately U-shaped laminated pole shoes, which are arranged astride on an approximately square stator winding with rounded corners. The legs of the odd-numbered pole shoes are of equal length and protrude radially to the inside. The even-numbered pole shoes are also of equal length and protrude to the outside. On each side of the stator, rotor disks of ferromagnetic material are provided. On the radial side of the rotor disks, which are turned towards the end face's of the stator's pole shoes, alternating north and south poles are formed by means of permanent magnets at same angular distances. The upper and the lower U-sides of the pole shoes overlap in a claw-like manner the stator winding in radial direction.

A disadvantage of the electric motor of the document DE 29 13 691 A1 is that the forces only work unilaterally on the provided rotor disks. Thus, the presented motor principle has not been applied for many years.

Furthermore, an electrical machine of the above mentioned type is known from the document DE 103 22 474 A1, which is provided as disk rotor device in axial flux direction. The stator of said electrical machine comprises a pole disk with interlocking, trapezoid, flat pole segments extending from the stator circumference and the stator centre. Thereby, the inward-oriented pole segments are connected and carried by an outer hollow cylinder and the outward-oriented pole segments are connected and carried by a central, solid cylinder located in the stator centre, to say lying on the extension of the rotation axis of the machine. The equidistant pole segments are of magnetic, conductive material and arranged such that an inward-oriented pole segment is followed by an outward-oriented pole segment in circumferential direction. On the back side of the stator, a back iron yoke is provided connecting the outer connecting hollow cylinder with the central connecting solid cylinder. Between back iron yoke and pole disk, an excitation winding, being provided as annular coil, is arranged coaxially to yoke and pole disk.

The rotor of the known machine has a disk-shaped rotor body, whose disk surface, facing the respective stator, is provided with adjacent permanent magnets over the entire surface. The magnetization direction is in circumferential direction opposite to the successive permanent magnets.

In a first embodiment, this electrical machine comprises a rotor and only one stator. To avoid bearing problems caused by the electromagnetic forces acting on the rotor, the electrical machine is symmetrical in an improved embodiment, wherein stators are provided at both sides of the rotor.

The known electrical machine has only few poles. Since the stator pole segments of the electrical machine nearly extend over the entire radius of the stator, respectively, the number of poles is also geometrically limited so that said known electrical machine is not suitable for high specific torques. Moreover, due to the symmetrical structure of said electrical machine, the permanent magnets are to be provided, for instance to be glued, on both disk sides of the rotor, whereby the rotor becomes relatively heavy. Alternatively, the entire rotor disk of said known electrical machine can also be of magnetic material.

Furthermore, from the document DE 298 14 964 U1, a generator of a rotation type is known, which can also be allocated to the above mentioned type. The generator is provided for the attachment to a bicycle hub. Said known generator comprises a magnetic rotor being composed of a number of adjacent permanent magnets of alternating polarity to a rotor ring. The rotor is held externally by the cage-shaped hub and is jointly rotated with the rotating hub causing an external rotor motor principle. The hub is provided on a shaft, whose both ends are fixed to a bicycle frame. The shaft is passed through a clearance hole of the rotor.

On both sides of the rotor, stator elements are provided with each enclosing a winding. Each stator element comprises an annular inner frame, from which spaced, dovetail-shaped first stator pole segments extend radially to the outside as well as an annular outer frame from which spaced, dovetail-shaped second stator pole segments extend to the inside and in which the inner frame having first stator pole segments is introduced. The number of the first stator pole segments is equal to the number of the second stator pole segments. Furthermore, the stator pole segments and their spacings are provided such that the first stator pole segments interlock in the spacings between the second stator pole segments without contacting each other and vice versa. The winding is in the spacing between the inner and the outer frame, respectively. Said generator also comprises only few poles and thus is not provided for high torques. The rotor made of single permanent magnets is also not suitable for the absorption of high forces.

BRIEF SUMMARY OF THE INVENTION

The objection of the present invention is to provide an electromechanical transducer of the above mentioned type with increased efficiency and a technologically simple producibility.

The object is solved by an electromechanical transducer of the initially mentioned type, in which the radius, at which the radially inner supporting bars are spaced from the rotation axis of the electromechanical transducer, is larger than the radial extent of the magnetic active faces of the stators.

While the radially outer and radially inner magnetic active boundary surfaces of the stators of the direct drive described in the document EP 2 255 431 B1 are separated from each other by the winding groove, the projections of the stators of the electromechanical transducer according to the invention protrude beyond the winding groove. Thereby, the magnetic active faces of the electromechanical transducer of the present invention are significantly larger than in the document EP 2 255 431 B1. Accordingly, a higher magnetic flux between stator and rotor and thus also an increased power density in comparison to the known electromechanical transducer can be achieved.

In addition, the radially outer and radially inner magnetic active boundary surfaces of the stators respectively the projections extending from the supporting bars of the electromechanical transducer according to the invention are provided in a clear distance to the rotation axis of the rotor. Thereby, the radially outer and radially inner magnetic active boundary surfaces of the stators form a circular ring, being spaced from the rotation axis, around the rotation axis of the electromechanical transducer. Such an arrangement provides a plurality of stator pole segments to be arranged side by side in circumferential direction along the circular ring and said stator pole segments are opposite to a corresponding number of permanent magnets of the rotor. Hence, the electromechanical transducer according to the invention can be provided with a very high number of poles.

According to the invention, the radially inner supporting bars of the stator form a hollow shaft around the rotation axis of the rotor. Preferably, the rotor is annular and provided with an inner hole according to the size of the stator's inner hollow space, to say as a hollow shaft. Thereby, the inner hollow space of the electromechanical transducer can be used, for instance, for mobile applications to place therein a drive and/or brake device or, for instance, for stationary applications, to place therein a power supply and/or work piece supply.

Because of the air gap being respectively provided between the projections according to the invention and extending parallel to the circumferential direction of the rotor, it is ensured that the projections being opposite to each other do not touch each other and thus do not cause a magnetic short circuit.

In a favored embodiment of the electromechanical transducer according to the invention, radially extending bars of solid, non-magnetic material are provided in circumferential direction of the at least one rotor, said bars being between the permanent magnets or between pairs of permanent magnets comprising a north pole and a south pole, respectively. In contrast to the prior art, no magnetic material is used in the composite material of said rotor. The non-magnetic bars arranged between the permanent magnets or the pairs of permanent magnets provide for intermediate stiffenings of non-magnetic material. Said non-magnetic material can be selected in such way that it provides an increased mechanical load capacity, compared to the magnetic material of the permanent magnets. By using the non-magnetic bars, the overall stability of the rotor can be significantly increased without having the permanent magnets to be glued on a stiffening carrier plate. Hence, the transducer according to the invention can be provided with a low rotor weight and still be used for the production of large motors with high power density.

It is particularly advantageous when the permanent magnets or the pairs of permanent magnets are embedded spaced to one another in a non-magnetic rotor base carrier, for instance, a rotor base carrier of fiber-enhanced plastic. By such an arrangement, the permanent magnets can be arranged such that their magnetic active faces on both sides of the rotor base carrier material are effective, so that permanent magnets do not have to be glued on both sides of the rotor base carrier. Thereby, the rotor becomes very light and yet is extremely stable when selecting a suitable rotor base carrier material and when providing corresponding non-magnetic intermediate stiffenings between the permanent magnets or pairs of permanent magnets.

In a preferred embodiment of the electromechanical transducer according to the invention, the first stator section and the second stator section are stator segments formed separately from each other. This kind of constructive design facilitates the technological manufacturing of the stators of the electromechanical transducer according to the invention. Hence, the first and the second stator section with stator backs, supporting bars and projections can be produced separately and can be suitably mounted in a next step. Furthermore, both stator sections can be provided with different magnetic properties.

According to an embodiment of the electromechanical transducer according to the invention, the projections are provided in form of projection teeth which at least partly overlap the winding groove. The projections' tooth form has proven especially valuable. Thereby, the respective magnetic active face, being opposite to the rotor surface, at the tooth back of the projection teeth is preferably flat, whereas the tooth tip section overlaps the winding groove. The tooth tip area can be provided such that windings can be placed with a suitable size and number into the winding groove.

If the projection teeth, for instance, are provided such that said projection teeth comprise at least above the winding groove a wedge-shaped decreasing thickness parallel to the rotation axis, the space for the windings in the winding groove will be increased effectively.

It is of further advantage, if the projection teeth comprise at least in their radial extension a trapezoid decreasing width above the winding groove. Thereby, a suitably large air gap is provided between the projections in circumferential direction.

In a simple embodiment of the invention, the face respectively the tooth tip area being opposite the rotor surface, in respectively on which the permanent magnets are provided, is flat. To yield certain desired flux densities, it can also be favorable, when the projection teeth are rounded towards the rotor, wherein the magnetic active faces of the projection teeth comprise an arching profile in circumferential direction of the rotor, to say an increasing and decreasing arching profile in said direction of the rotor. The roundness respectively the arching of the face edge respectively end face of the projection teeth pointing to the rotor can be provided convexly or concavely depending on the application. A concave design of the face of the projection teeth is practicable when rectangular waves are applied to the transverse winding; in contrast, a convex design of the face of the projection teeth is of advantage when a sinusoidal excitation of the winding is used.

In a particular highly efficient variant of the electromechanical transducer according to the invention, the first stator section and the second stator section are assembled of single stator pawls, wherein at each stator pawl, one of the projections is provided, which alternately overlap radially outward and radially inward the winding groove in an alternating manner. Hence, in said embodiment, the supporting bars do not form a self-contained ring, but are each separately provided. Each stator pawl comprises a pawl back, being a part of the stator back, a supporting bar and a projection, wherein the pawl back and the projection are mainly aligned parallel to each other, so that each stator pawl can be placed in a bracket-shaped respectively clamp-shaped manner around the winding groove. The stator pawls are arranged alternately opposite one another such that the projections interlock in a comb-like manner without touching each other. Thereby, the winding groove is provided in the intermediary space between the pawl backs, the supporting bars, and the projections. Said embodiment is technically particularly easily applicable since each stator pawl can be produced separately and is easy to produce and successively, the stator pawls, also easily, can be connected in an annular manner, to form a stator.

The electromechanical transducer according to the invention preferably comprises a rotor base carrier, in or on which the permanent magnets of the rotor are provided. The rotor base carrier of the present invention can be of ferrous as well as of non-ferrous material. Here, a limitation to non-ferrous material is not necessary.

In the electromechanical transducer according to the invention, the permanent magnets provided in the rotor can be of ferrous materials or of non-ferrous materials. The advantage of using permanent magnets of ferrous materials is the higher achievable power density, which is higher than in all non-ferrous materials, for instance, when using neodymium-iron-boron as material for the permanent magnets. In contrast, certain non-ferrous materials have advantages at higher temperatures since their Curie point is sometimes higher than that of ferrous materials.

In a preferred embodiment of the electromechanical transducer according to the invention, the permanent magnets are provided with alternating north and south poles in and/or on the rotor in circumferential direction of the rotor. Thus, in said embodiment, the permanent magnets of the rotor do not repel each other in circumferential direction, as is the case, for instance, in the direct drive of the document EP 2 255 431 B1. By the arrangement of the alternating north and south poles of the rotor according to the invention, the magnetic flux can directly run in axial direction starting from the projections of a stator through the north and south poles of the rotor's permanent magnets to the projections of the stator being on the other side of the rotor. Furthermore, by the straight in axial direction running course of the flux, parasitic stray fields can be minimized. Especially by the different magnet arrangement with the polarization in flux direction, the magnet flux is bundled and additionally shortened. In contrast, by the permanent magnet arrangement of the direct drive in the document EP 2 255 431 B1, a course of the flux is chosen, which, at first, axially runs from the stator to the rotor, in the rotor, said flux runs in circumferential direction of the rotor, and then again axially runs from the rotor to a further stator, whereby efficiency losses are linked to said process.

In this connection, it is of particular advantage when the electrical connection polarity of the windings of the stators provided on both sides of the rotor is opposite to each other. By said type of current supply, both stator sections of a stator respectively the stator pawls associated to said stator sections have different polarities. To say, that if the stator sections are assembled of single stator pawls, the respectively side by side arranged projections of the stator pawls each comprise opposite magnetic poles. The magnetic effect of the stator pawls results in additional force applications onto the rotor, by what the efficiency of the electromechanical transducer according to the invention may be even further increased.

The alternating arrangement of the north and south poles of the rotor further has the advantage that in a further example of the electromechanical transducer according to the invention, the rotor is of a magnetic material and the permanent magnets of the rotor are easily provided by magnetization of the magnetic material. The magnetization can be done, for instance, by applying corresponding terminals of a magnetization device at the outer and inner edge of an annular rotor. By such an arrangement, the complex assembly of the rotor with single permanent magnets is not necessary so that the electromechanical transducer according to the invention is technologically easier and thus more cost-efficiently producible.

In a preferred embodiment, the electromechanical transducer is provided according to an internal rotor principle, to say with at least one rotor fixed to a central, rotatable shaft of the electromechanical transducer.

In a functional embodiment of the invention, the stators are provided segmentedly in circumferential direction of the electromechanical transducer. Said embodiment makes it easier to provide each stator with a separate winding and thus to operate the electromechanical transducer multiphase.

BRIEF DESCRIPTION OF THE SEVERAL VIEWS OF THE DRAWING

Preferred embodiments of the present invention, their arrangement, function, and advantages are described by figures in more detail in the following, wherein FIG. 1 schematically shows a section of an embodiment of an electromechanical transducer according to the invention in a perspective view.

DESCRIPTION OF THE INVENTION

Figure 1:
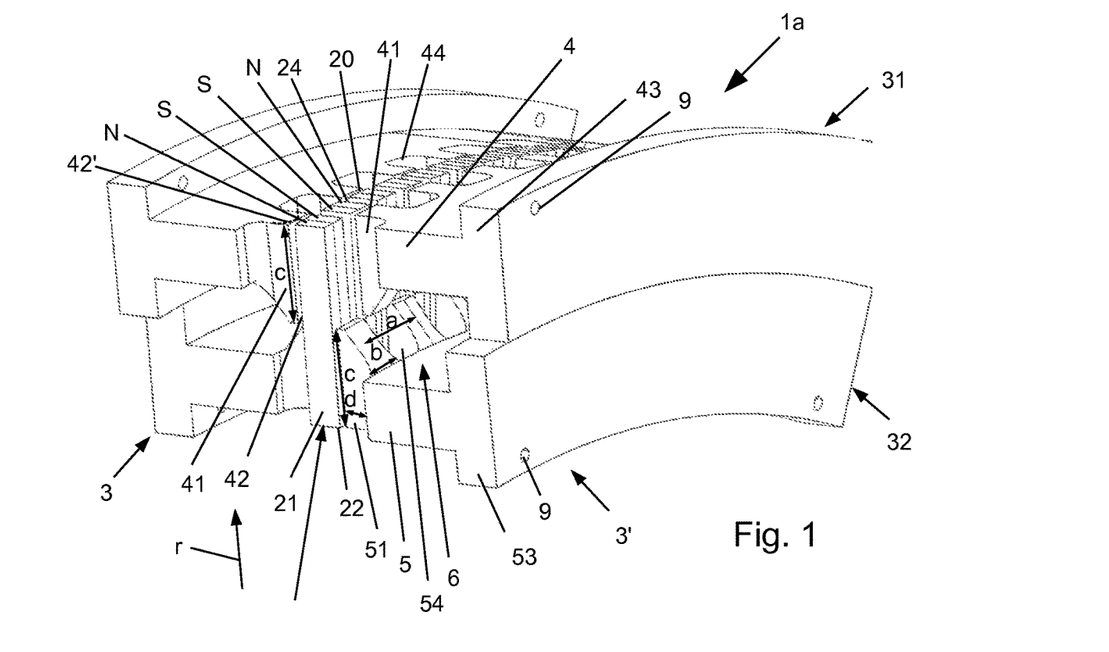

FIG. 1 schematically shows a section of an electromechanical transducer 1a according to the invention. The details of the electromechanical transducer 1a are shown in a perspective view in FIG. 1.

The electromechanical transducer 1a comprises a rotor 2, of which only permanent magnets 21, 22 provided in the rotor 2 are shown in FIG. 1. The permanent magnets 21, 22 are arranged in a rotor base carrier 23 not shown in FIG. 1 but in FIG. 6 and said permanent magnets are arranged in an annular manner in the rotor base carrier 23.

Figure 7:
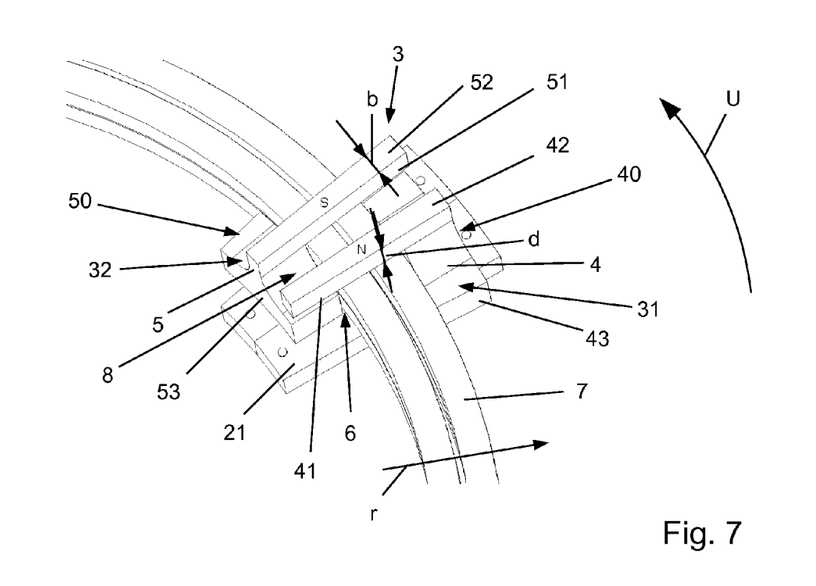
FIG. 7 schematically shows a perspective view of a section of the electromechanical transducer of FIG. 1, in which two stator pawls arranged opposite each other and a winding running through same are shown exemplarily.

The rotor 2 is rotatable around a rotor axis, which corresponds to the rotation axis A of the electromechanical transducer 1c shown in FIG. 7. In radial direction r of the rotor 2, the permanent magnets 21, 22 in rotor 2 are provided in a stellar respectively radiant manner. Thereby, the north poles N and south poles S of the permanent magnets 21, 22 are provided such that permanent magnets 21, 22 arranged side by side repel each other, respectively.

Figure 2:
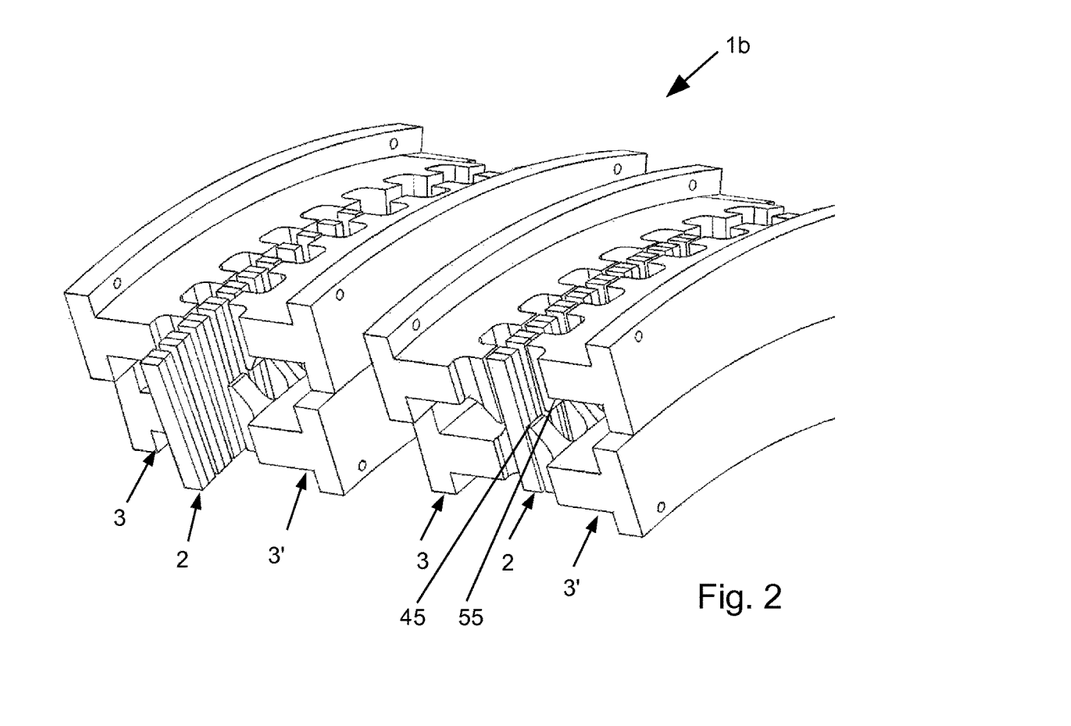
FIG. 2 schematically shows a section of a further embodiment of the electromechanical transducer according to the invention with a cascading double-stator-rotor-stator-arrangement in a perspective view.
Figure 6:
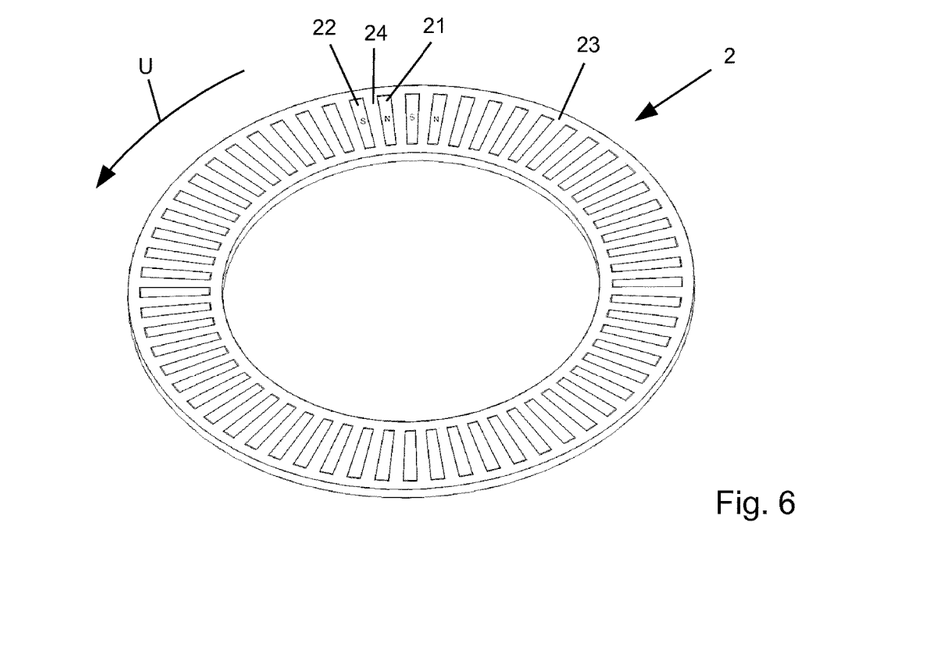
FIG. 6 schematically shows a rotor of the embodiment of FIG. 5 in a perspective top view.

In the examples of FIG. 1 and FIG. 2, permanent magnets 21, 22 are provided in form of pairs of permanent magnets 20, each comprising a north pole N and a south pole S, which are arranged directly to one another. In the embodiments of FIGS. 1, 2 and 6, the pairs of permanent magnets 20 as well as the permanent magnets 21, 22 are spaced to each other, respectively. Between the pairs of permanent magnets 20 respectively between the permanent magnets 21, 22, non-magnetic, in radial direction extending bars 24, being respectively between the pairs of permanent magnets 20 respectively between the permanent magnets 21, 22, are provided. The bars 24 of non-magnetic material such as of fiber-enhanced plastics form intermediate stiffenings of the rotor 2 between the permanent-magnetic regions. In other, non-shown variants of the electromechanical transducer according to the invention, the bars 24 can also be omitted.

Stators 3, 3' are provided on both sides of the rotor 2. The stators 3, 3' are provided between stator 3, 3' and rotor 2 with each having the same distance to the rotor 2 under formation of a double air gap. The stators 3, 3' are at least partly of soft magnetic material.

Each of the stators 3, 3' has a first, radially outer stator section 31 and a second radially inner stator section 32 being at a radial distance to the rotation axis A of the electromechanical transducer 1a. The stator sections 31, 32 are separately provided and successively suitably arranged in the electromechanical transducer 1a and, if necessary, said sections are connected segments of the stators 3, 3'. Each stator 3, 3' comprises a stator back 43, 53. From the stator backs 43, 53, supporting bars 4, 5 axially extend in the direction of the rotor 2. The supporting bars 4 of the first stator section 31 are radially arranged outside, whereas the supporting bars 5 of the second stator section 32 are radially arranged inside.

At the ends of the supporting bars 4, 5, projections 41, 51 are provided. The projections 41, 51 comprise both a thickness d pointing in the direction of the rotor 2 and a width b pointing in the circumferential direction of the electromechanical transducer 1a. In radial direction r, said projections are each oppositely aligned. The projections 41 point radially inwards and the projections 51 point radially outwards. The projections 41, 51 further comprise flat end faces facing the rotor 2, which provide the magnetic active faces 42, 52 of the stators 3, 3'. The magnetic active faces 42, 52 comprise a length c extending in radial direction r of the electromechanical transducer 1a.

The radially inner supporting bar 5 is provided at a radial distance to the rotation axis A of the electromechanical transducer 1a. The radial distance of the supporting bar 5 to the rotation axis A is thereby larger than the radial extent c of the magnetic active faces 42, 52 of the projections 41, 51. For instance, the radial distance of the supporting bar 5 to the rotation axis A of the electromechanical transducer 1a can be 1.5 to 10 times as large as the radial extent c of the magnetic active faces 42, 52 of the projections 41, 51 of the stators 3, 3'. A radial distance of the supporting bar 5 to the rotation axis A, which is 1.5 to 6 as large as the radial extent c of the magnetic active faces 42, 52 of the projections 41, 51, is especially preferred. In a functional embodiment of the invention, the radial distance of the supporting bar 5 to the rotation axis A is 1.5 to 3 times as large as the radial extent c of the magnetic active faces 42, 52 of the projections 41, 51.

To say, in the electromechanical transducer 1a according to the invention, technically both the radially outer first stator section 31 as well as the radially inner second stator section 32 are provided radially outside, forming a transducer edge region, in comparison to the transducer centre.

At the supporting bars 4 and 5, a plurality of projections 41, 51 with magnetic active faces 42, 52 are provided, respectively. Between the stators 3, 3', the rotor 2 also accordingly comprises a plurality of permanent magnets 21, 22 which are opposite to the magnetic active faces 41, 51 of the stators 3, 3'. Thus, the result is a multi-pole arrangement.

The electromechanical transducer 1a according to the invention is thereby suitable for high specific torques.

In the embodiments of FIG. 1 and FIG. 2, the stator back 43, the supporting bar 4, and the projection 41 of the first stator section 31 as well as the stator back 53, the supporting bar 5, and the projection 51 of the second stator section 32 are each provided in one piece, to say without an intermediate air gap, respectively.

The stator backs 43, 53 with their supporting bars 4, 5 projecting in direction to the rotor 2 comprise a T-shape in the cross section of the embodiments shown in the FIGS. 1 and 2. Thus, it is possible to provide the stator backs 43, 53 with fixing means 9 at which the stators 3, 3' can be connected to another component.

The projections 41 at the first stator section 31 as well as the projections 51 at the second stator section 32, being provided at the corresponding supporting bars 4, 5, are each evenly spaced to one another. Between the projections 41 and between the projections 51, groove-like recesses 44, 54 are provided, respectively. Hence, between the projections 41 and between the projections 51, a distance a is provided, respectively, which typically increases radially outwards due to the radial arrangement. In the embodiments of FIG. 1 and FIG. 2, the groove-like recesses 44, 54 of the shown top view, to say in their radial extension, are U-shaped, with rounded U-internal corners towards the respective supporting bar 4, 5.

The projections 41, 51 are provided at the corresponding supporting bars 4, 5 and aligned such that said supporting bars 4, 5 at least partly overlap a winding groove 6 being between the radially outer and the radially inner lying supporting bars 4, 5 of the respective stator 3, 3'. Thus, the projections 41, 52 of the embodiments in FIGS. 1 and 2 are provided as projection teeth, which overlap the free space for the winding groove 6 in radial direction r, starting from the respective supporting bar 4, 5.

Figure 8:
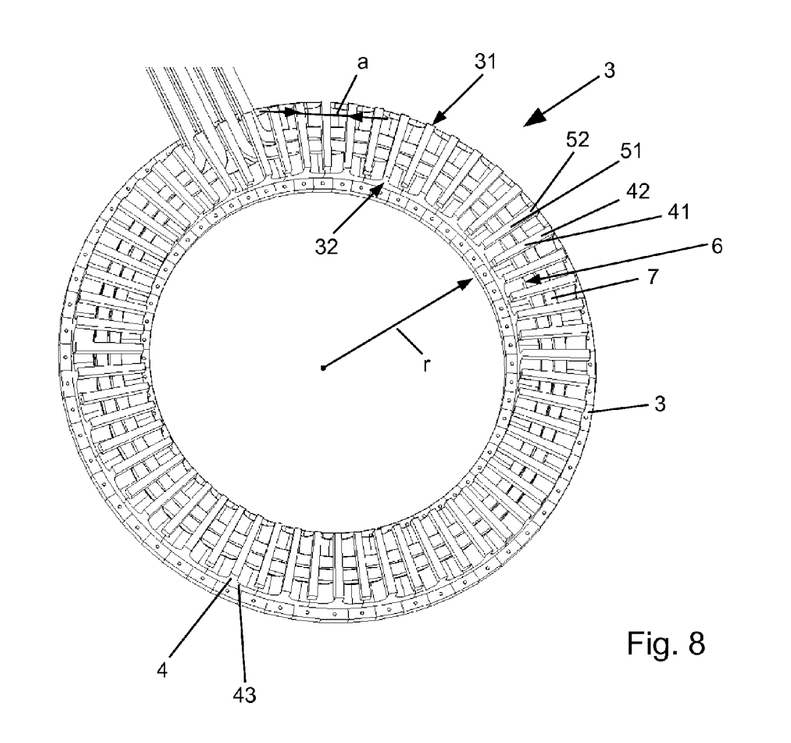
FIG. 8 schematically shows a stator of the electromechanical transducer of FIG. 1 with windings running through said stator in a perspective top view.
Figure 9:
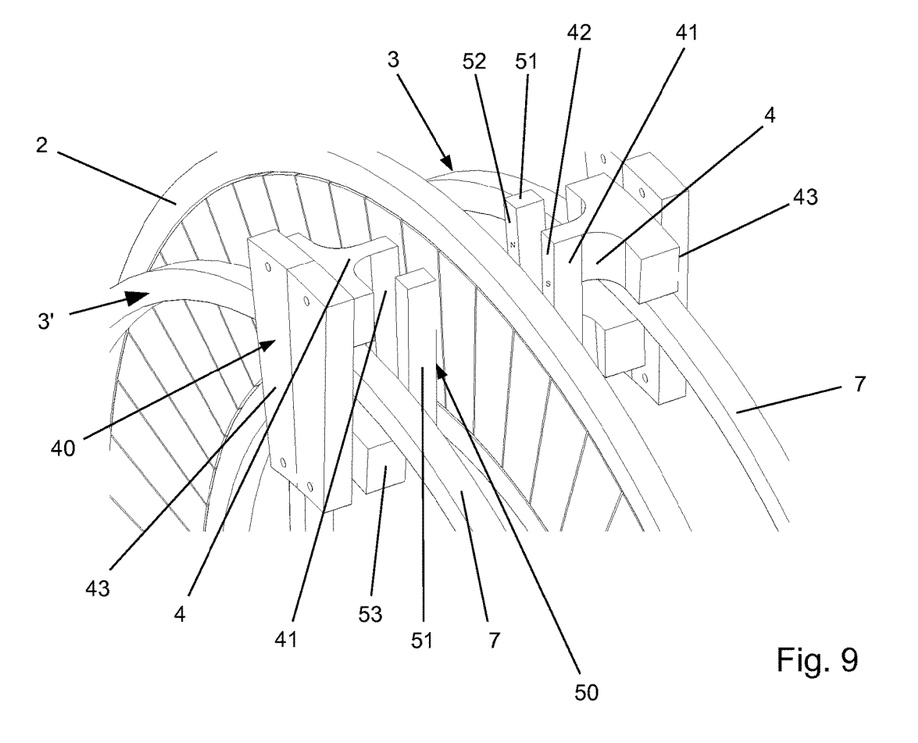
FIG. 9 schematically shows a detailed representation of the electromechanical transducer of FIG. 1, wherein single stator pawls on both sides of the rotor and a winding running through each stator pawl of a stator are shown exemplarily and wherein the remaining stator pawls of the stator have been left out for reasons of clarity.

In the embodiments of FIG. 1 and FIG. 2, the ends 45, 55 of the stator teeth respectively projections 41, 51, each being staggered opposite each other in radial direction r, are provided on one radius respectively on one line. To say, the projection teeth extend here only up to half of the winding groove 6. Basically, it is also possible that the projections 41, 51, as is shown in FIGS. 8 and 9, overlap the winding groove 6 such that said projections finger-like interlock above the winding groove 6 but without touching each other laterally. Then again, the electromechanical transducer according to the invention also works when the projections 41, 51 incompletely overlap, thus projection stubs only protruding beyond the edge of the winding groove 6.

As already mentioned above, the projection teeth have preferably flat end faces, which are opposite the rotor 2. As is schematically indicated in FIG. 1 by the tooth form 42', the magnetic active end face 42, 52 of the projections 41, 51 can also be provided rounded towards the rotor 2. Thereby, the curvature of the end face of the projections 41, 51 can be provided convexly, as is indicated by FIG. 1, or also concavely towards the rotor 2.

The tooth form in FIG. 1 of the shown embodiment of the electromechanical transducer 1a is provided such that, with regard to their thickness d, the projections 41, 51 decrease in a wedge-shaped manner at least above the winding groove 6 in axial direction of the electromechanical transducer 1a. The thickness d decreasing wedge-shaped above the winding groove 6 has the advantage that more space is available for the inclusion of windings 7 inside the winding groove 6 in total.

Moreover, according to the embodiment in FIG. 1, the width b of the projection teeth decreases at least above the winding groove 6 in a trapezoid manner in their radial extension r. The decreasing width b of the projection teeth in radial direction r ensures that a suitable air gap between the projections 41, 51 is provided and thus a magnetic short circuit between the projections 41, 51 being opposite each other is prevented.

FIG. 2 schematically shows a further embodiment of an electromechanical transducer 1b according to the invention. The electromechanical transducer 1b is a double-cascade-arrangement of the embodiment of the electromechanical transducer 1a of FIG. 1. Thus, the electromechanical transducer 1b comprises two rotors 2, wherein stators 3, 3' on both sides of the rotor 2 are provided. Concerning the formation of the rotors 2 and the stators 3, 3', attention is drawn to the above descriptions of FIG. 1.

Figure 3:
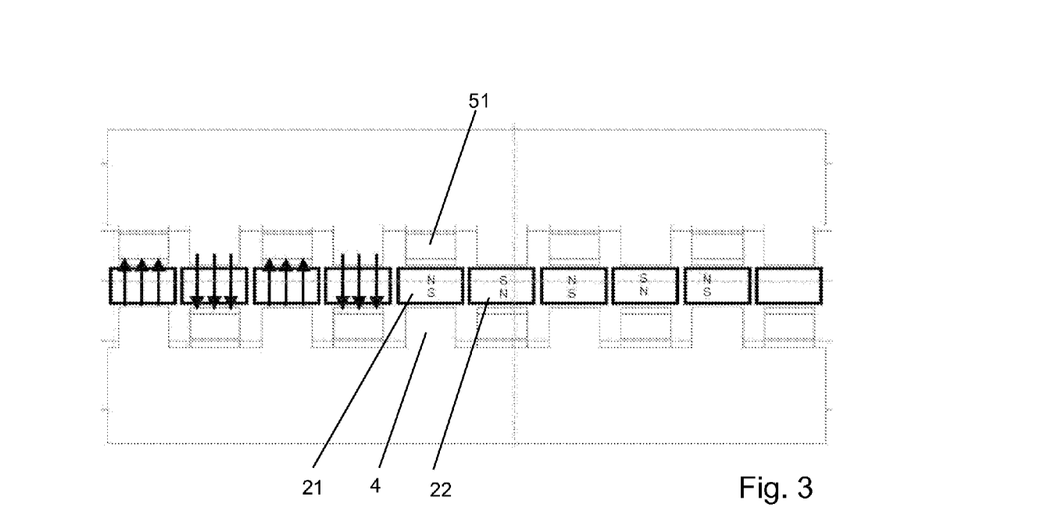
FIG. 3 schematically shows the course of the magnetic flux of the FIGS. 1 and 2 in the shown embodiments of the electromechanical transducer.

Different to the FIGS. 1 and 2, in further embodiments of the present invention, the permanent magnets 21, 22, being provided in the respective rotors 2, can also be aligned such that the north poles N and the south poles S alternate in circumferential direction U of the electromechanical transducer. Such arrangement has the advantage that a direct course of the magnetic flux from a stator 3 through a rotor 2 to another stator 3', as is schematically shown in FIG. 3, is possible.

Figure 4:
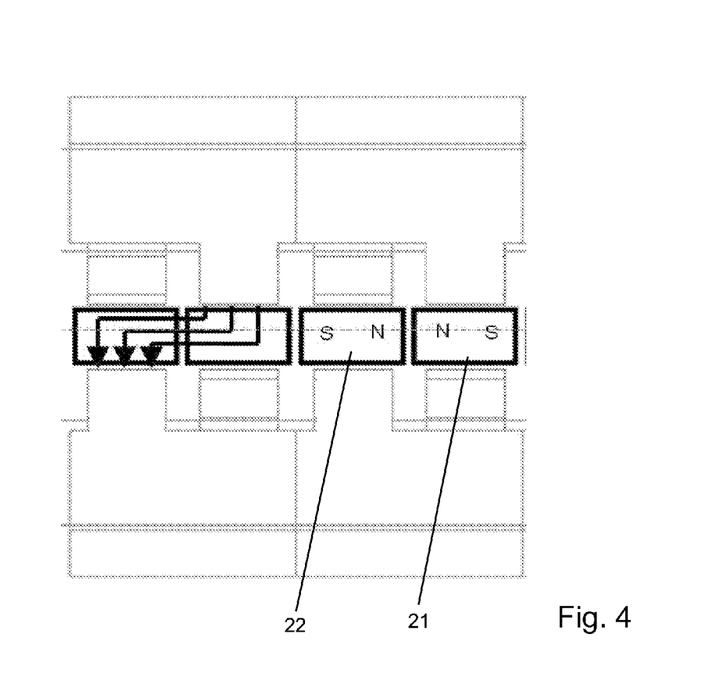
FIG. 4 schematically shows, in comparison to FIG. 3, the magnetic flux course according to the document EP 2 255 431 B1.

By comparison, in FIG. 4, an embodiment of the course of the magnetic flux is shown, in which the permanent magnets, similar to the document EP 2 255 431 B1, are provided in the rotor 2 such that the permanent magnets 21, 22 being side by side repel each other.

Figure 5:
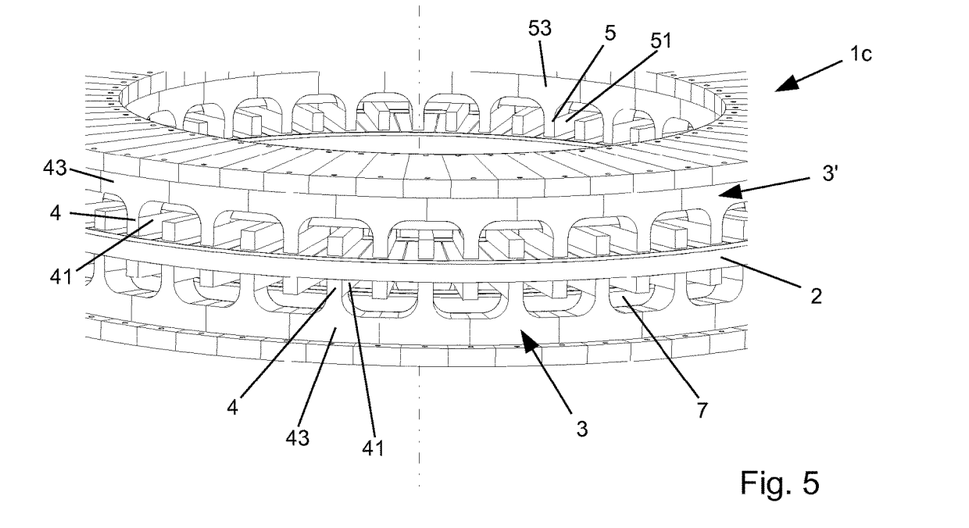
FIG. 5 schematically shows a perspective view of yet another embodiment of the electromechanical transducer according to the invention.

FIG. 5 schematically shows a further embodiment of an electromechanical transducer 1c in a perspective view.

The electromechanical transducer 1c comprises a rotor 2 and stators 3, 3' provided on both sides of the rotor 2. The rotor 2 is provided rotationally symmetrical around a rotor axis A and is rotatable around said rotor axis A. The stators 3, 3' are fixed in position. Each of the stators 3, 3' comprises two stator sections 31, 32, which will be described in more detail in the following. As can already be seen in FIG. 5, each stator section 31, 32 is assembled of single stator pawls 40, 50, which radially overlap the alternating windings 7 provided in the winding groove 6 from the outside respectively from the inside. Each stator pawl 40, 50 comprises a stator back 43 respectively 53, a supporting bar 4, 5 connected to the stator back 43, 53 and extending in axial direction A, and projections 41, 51 provided at the supporting bars 4, 5 and extending in radial direction, which will also be described in more detail in the following.

FIG. 6 shows the rotor 2 of the electromechanical transducer 1c of FIG. 5 in a perspective top-view on the rotor 2.

The rotor 2 comprises a rotor base carrier 23 of a non-magnetic material. Permanent magnets 21, 22 are provided in the rotor base carrier 23. The permanent magnets 21, 22 comprise alternating north poles N and south poles S in circumferential direction U of the rotor 2. Needless to say that the respective opposite poles of the north and south poles shown in FIG. 6 are provided on the respective back side of the rotor 2.

In the embodiment of FIG. 6, the rotor base carrier 23 is, for instance, of fiber-enhanced plastics. The permanent magnets 21, 22 are embedded in the rotor base carrier 23 such that their magnetic active faces are active at the upper and lower disk surfaces of the rotor 2. Thereby, the magnetic active faces of the permanent magnets 21, 22 close flush with the upper and lower disk surfaces of the rotor 2. The intermediate ranges of the rotor base carrier 23 between the permanent magnets 21, 22 being integrated in the rotor base material, to say, the non-magnetic bars 24 being between the permanent magnets 21, 22 stiffen the rotor 2 such that said rotor can be exposed to very high mechanical loads.

In the embodiments of FIGS. 1, 2 and 6, the permanent magnets 21, 22 are each provided ashlar-shaped and the stator poles are provided with rectangular magnetic active face 42, 52. Thus, a simple and low-priced production is the result. Basically, it is also possible to provide the permanent magnets 21, 22 as well as the magnetic active faces 42, 52 of the stator poles in a trapezoid manner. This is particularly recommended in embodiments of the present invention, in which the radial extent of the permanent magnets 21, 22 respectively the stator poles is relatively large.

FIG. 7 schematically shows only for demonstration purpose a detail of the electromechanical transducer 1c of FIG. 5. In the example of FIG. 7, two opposite standing stator pawls 40, 50 of the electromechanical transducer 1c are shown, wherein the stator pawls 40, 50 overlap a winding groove 6 with embedded windings 7 therein. In the embodiment of FIG. 7, further stator pawls, besides the shown stator pawls 40, 50, are not shown for reasons of clarity.

The stator pawl 40 belongs to the first stator section 31 of the stator 3 or 3'. The stator pawl 40 comprises a stator back 43 extending in radial direction r, which is provided below the winding 7 in the example of FIG. 7. The supporting bar 4 extends radially outside starting from the stator back 43 in axial direction A of the electromechanical transducer 1c. The projection 41, in turn, extends from the supporting bar 4 in radial direction r in the direction to the rotor axis A. On the end face of the projection 41, the magnetic active face 42 is provided, which is opposite to the rotor range of the rotor 2 containing the permanent magnets 21, 22 during operation of the electromechanical transducer 1c.

The projection 41 comprises a thickness d in axial direction A as well as a width b in circumferential direction U. In certain embodiments of the present invention, the thickness d and/or the width b of the projection 41 in the direction to the rotor axis A can gradually decline.

The stator pawl 40 encompasses the windings 7 of the winding groove 6 in a stirrup-shaped manner from radially outside. In the embodiment of FIG. 7, the projection 41 of the stator pawl 40 provides the north pole of the stator pawl 40, while the stator back 43 provides the south pole S of the stator pawl 40.

Besides the stator pawl 40, the stator pawl 50 is provided. The stator pawls 40, 50 of the electromechanical transducer 1c interlock in a comb-like manner.

The stator pawl 50 comprises a radially extending stator back 53, which is provided between the windings 7 and the stator back 43 of the stator pawl 40 in the example of FIG. 7. Starting from the stator back 53, the supporting bar 51 extends in axial direction, from which the projection 51, which is provided with a magnetic active face 52 thereon, is radially protruding outwards.

The stator pawl 50 is oppositely poled to the stator pawl 40. To say, in the embodiment of FIG. 7, the projection 51 provides a south pole S and the stator back 53 provides a north pole N of the stator pawl 50.

The stator pawls 40, 50 are arranged such that an air gap 8 is provided between the projections 41, 51 in circumferential direction. The distance between the projections 41, 51 increases typically but not necessarily radially outwards.

FIG. 8 schematically shows the stator 3 of the electromechanical transducer 1c of FIG. 5 in a perspective top-view.

As can be seen in FIG. 8, the projections 41, which are radially outside of the supporting bars 4, are angularly offset with regard to the projection distance by half a pitch with respect to the projections 51 being radially inside the supporting bars 5, respectively. This way, the projections 41 can interlock unhindered in the spacing between the adjacent projections 51. Contrariwise, the projections being provided at the radially inner supporting bars 5 can interlock unhindered in the spacing between the projections 41. Thereby, the projection spacing a between the projections 41 respectively between the projections 51 is significantly larger than the width b of the projections 41, 51.

The stator pawls 40, 50 encompass the winding groove 6 with the windings 7 provided therein. Although, two windings 7 are respectively shown in the embodiments, it goes without saying that, basically, one winding 7 or more than two windings 7 can also be provided. Preferably, the windings 7 are hollow inside so that the windings 7 are coolable inside, for instance, with a cooling fluid. As is schematically shown in FIG. 8, the windings 7 are suitably led outside at least at one side of the stator 3 in order to get suitably electrically contacted.

Though the projections 41, 51 of the stator pawls 40, 50 encase the winding groove 6, said projections, however, are not connected to the respective corresponding stator back 43, 53 by their projections ends, being opposite to the supporting bars 4, 5.

FIG. 9 schematically shows a detail of FIG. 8 in a perspective side view on the rotor 2 and two pairs of stator pawls being on both sides of the rotor 2. The further stator pawls 40, 50 of the stators 3, 3' are here also not shown similar to FIG. 7 for reasons of clarity. As can be seen in FIG. 9, the magnetic active faces 42, 52 of the stator pawls 40, 50 of the stators 3, 3' are evenly spaced to the rotor 2, respectively. Accordingly, the rotor 2 can rotate unhindered between the stators 3, 3'.

Figure 10:
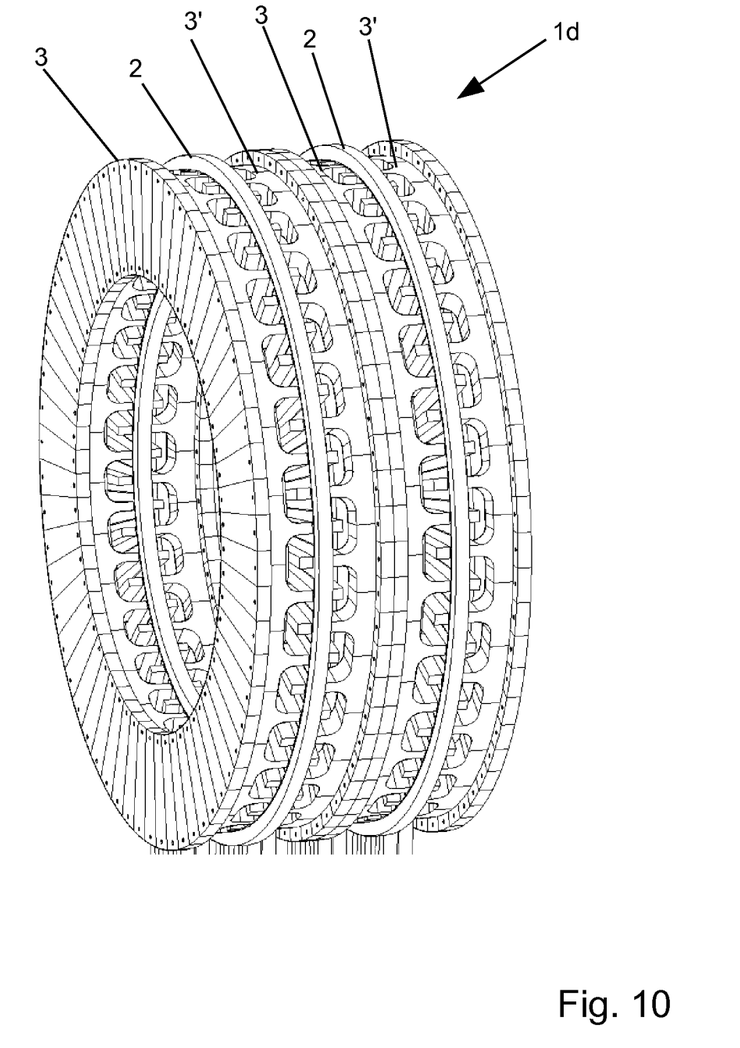
FIG. 10 schematically shows a further embodiment of the electromechanical transducer according to the invention with a cascade arrangement of stator, rotor, and stator in a perspective view.

FIG. 10 schematically shows a further embodiment of an electromechanical transducer 1d according to the invention with two axially stapled stator-rotor-stator-arrangements. Concerning the details of the rotors 2 and the stators 3, 3', attention is drawn to the above descriptions of the FIGS. 5 to 9.

Figure 11:
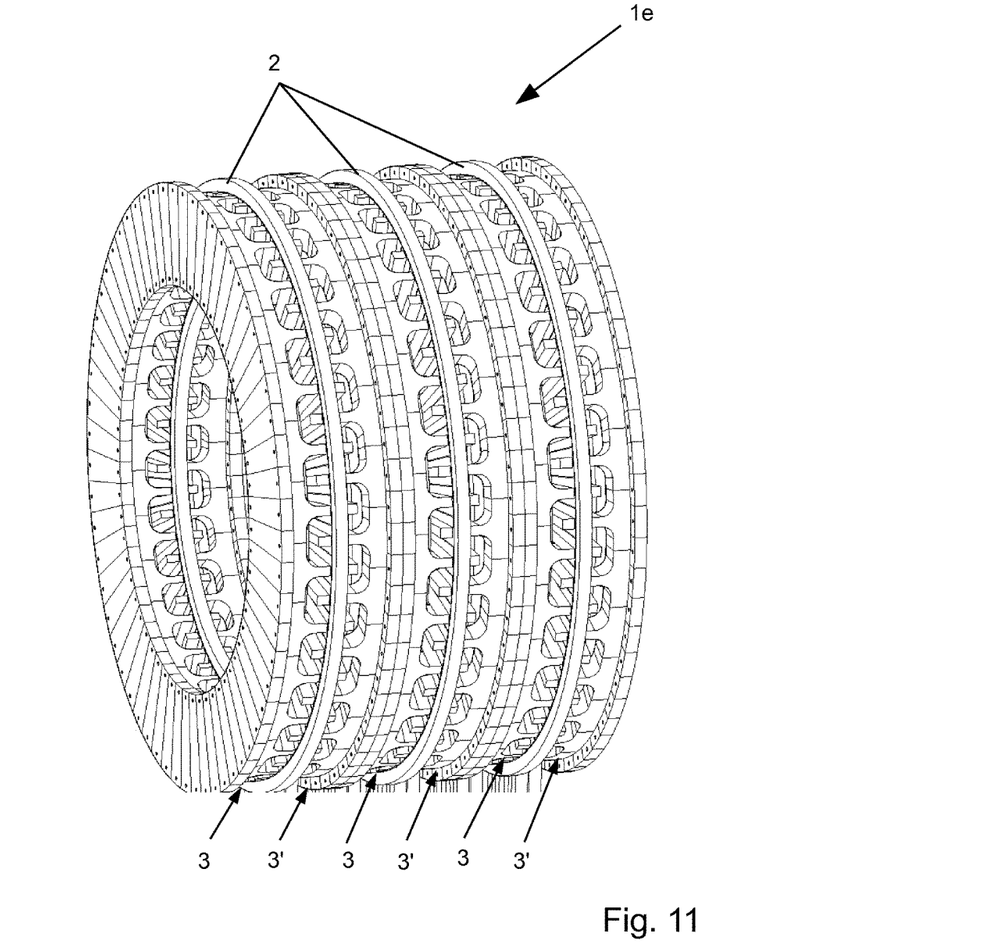
FIG. 11 schematically shows yet another variant of the electromechanical transducer according to the invention in a perspective view with a triple cascade arrangement of stator, rotor, and stator.

In FIG. 11, a further embodiment of an electromechanical transducer 1e according to the invention is schematically shown. The electromechanical transducer 1e comprises a triple cascade arrangement based on the embodiment of the electromechanical transducer 1c of FIG. 5. Accordingly, the electromechanical transducer 1e comprises three in axial direction stapled stator-rotor-stator-arrangements, to details of which attention is drawn to the above descriptions relating to FIG. 5 to FIG. 9.

The electromechanical transducer 1a, 1b, 1c, 1d, 1e can be used as motor as well as generator. Furthermore, the electromechanical transducer 1a, 1b, 1c, 1d, 1e is particularly suitable as direct drive, which can be provided with an axially short overall length. The electromechanical transducer 1a, 1b, 1c, 1d, 1e comprises a particular efficiency, wherein high specific torques can be reached when using the electromechanical transducer 1a, 1b, 1c, 1d, 1e in electrical machines. Moreover, the electromechanical transducer 1a, 1b, 1c, 1d, 1e according to the invention is distinguished by a technological simplified producibility and thus reduced production costs.

The electromechanical transducer 1a, 1b, 1c, 1d, 1e according to the invention can be switched differently as is known in the prior art.

In the embodiment of the electromechanical transducer 1c, which is shown in the FIGS. 5 to 9, the windings 7 of the stators 3, 3' are connected with electrical polarity opposite to each other.

In a favorable embodiment of the present invention, the electromechanical transducer 1a, 1b, 1c, 1d, 1e is operated three-phase by using a star connection. Basically, also two, four or even more than four phases are possible when using the electromechanical transducer 1a, 1b, 1c, 1d, 1e. In addition, it is also conceivable to operate the electromechanical transducer 1a, 1b, 1c, 1d, 1e with a delta connection.

For a multi-phase operation of the electromechanical transducer 1a, 1b, 1c, 1d, 1e according to the invention, the stators 3, 3' of an embodiment, which is not shown in the figures, of said electromechanical transducer can be formed segmented in circumferential direction of the electromechanical transducer 1a, 1b, 1c, 1d, 1e.

Moreover, different arrangements of the windings are possible.

A further advantage of the embodiment of the electromechanical transducer 1c, 1d, 1e shown in the FIGS. 5 to 11 is that the shown electromechanical transducer 1c, 1d, 1e can be provided with an optimized pole pitch, to say with a lower pole pitch compared to the prior art, although the electromechanical transducer 1c, 1d, 1e according to the invention comprises an at least equally high efficiency as known synchronous machines.

Figure 12:
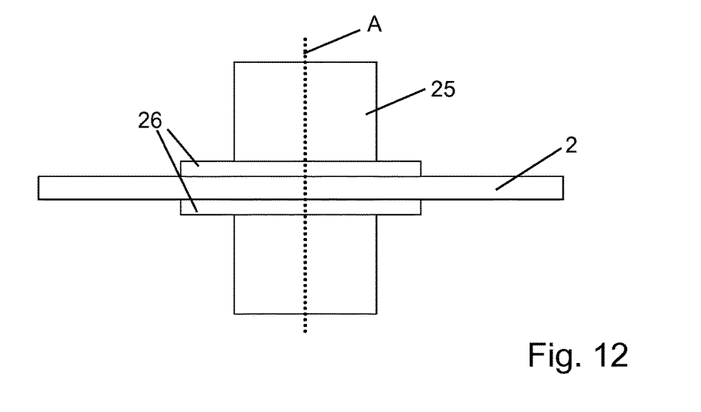
FIG. 12 schematically shows a rotor arrangement according to the internal rotor principle according to an embodiment of the electromechanical transducer according to the invention.

FIG. 12 schematically illustrates a rotor arrangement of an embodiment of an electromechanical transducer operating according to the internal rotor principle. The rotor 2 of said embodiment is mounted to a shaft 25 rotatable around the rotation axis A, which can be a hollow shaft, for instance. The connection of the rotor 2 to the shaft 25 is realized by at least one connection flange 26.

The invention claimed is:

1. An electromechanical transducer, comprising:
a rotor selected from the group consisting of a disk shaped rotor and an annular rotor and having a rotor axis;
permanent magnets disposed in or on said rotor in a concentrically radiant manner;
at least two stators disposed at both sides of said rotor and having stator backs, said stators formed at least partially of a soft magnetic material, each of said stators having a first stator section with radially outer supporting bars defining first magnetic active faces of said stator being opposite said rotor and a second stator section with radially inner supporting bars defining second magnetic active faces of said stator being opposite said rotor, each of said stators having an annular winding groove formed therein between said first and second stator sections for receiving at least one winding, said radially inner and outer supporting bars are each disposed in an annular manner and each extend parallel to said rotor axis in a direction of said rotor;
said first and second magnetic active faces of said stators are end faces of projections which are equally spaced to one other and which protrude from said radially inner and outer supporting bars in the direction of said rotor, said projections respectively disposed on said radially outer supporting bars being offset at an angle in relation to said projections being respectively provided on said radially inner supporting bars in respect of a projection spacing by half a pitch, and in at least one of the stators, said projections which are provided on said radially outer supporting bars and/or said projections which are provided on said radially inner supporting bars overlap at least partially over said winding groove in a radial direction so that said winding groove is provided between said stator backs, which hold said supporting bars, wherein said projections defining an air gap therebetween in said projections extending parallel to a circumferential direction of said rotor, respectively; and
a radius, in which said radially inner supporting bars are spaced to a rotation axis of the electromechanical transducer is larger than a radial extent of said first and second magnetic active faces of said stators.

2. The electromechanical transducer according to claim 1, wherein said first stator section and said second stator section are stator segments formed separately from each other.

3. The electromechanical transducer according to claim 2, wherein said first stator section and said second stator section have said stator backs, said supporting bars and said projections, said supporting bars form a closed ring.

4. The electromechanical transducer according to claim 2, wherein said first stator section and said second stator section contain different magnetic properties.

5. The electromechanical transducer according to claim 1, wherein said projections comb-like interlock over said winding groove without laterally touching each other thereby.

6. The electromechanical transducer according to claim 5, wherein said projections are in a form of projection teeth which at least partly overlap said winding groove, wherein said projection teeth only partly overlap said winding groove or only overlap said winding groove as far that ends of offset oppositely disposed projection teeth are provided on one radius and said projection teeth are rounded towards said rotor, wherein said magnetic active faces of said projection teeth contain an arching profile extending in a circumferential direction of said rotor.

7. The electromechanical transducer according to claim 1, wherein said projections are provided in form of projection teeth which at least partly overlap said winding groove, said projection teeth only partly overlap said winding groove or only overlap said winding groove as far that ends of offset oppositely disposed projection teeth are disposed on one radius and said projection teeth contain a wedge-shaped decreasing thickness, at least over said winding groove, parallel to the rotor axis.

8. The electromechanical transducer according to claim 1, wherein said projections are provided in form of projection teeth which at least partly overlap said winding groove, wherein said projection teeth only partly overlap said winding groove or only overlap said winding groove as far that ends of offset oppositely disposed projection teeth are provided on one radius and said projection teeth have a trapezoid decreasing width at least in a radial extension over said winding groove.

9. The electromechanical transducer according to claim 1, wherein said stator backs form a T-shaped cross section with said supporting bars projecting in the direction of said rotor.

10. The electromechanical transducer according to claim 1, wherein between said projections groove-shaped recesses are formed therein, respectively, wherein said groove-shaped recesses are provided U-shaped in their radial extension with rounded inner U-corners towards said supporting bars.

11. The electromechanical transducer according to claim 1, wherein said first stator section and said second stator section are formed of single stator pawls, wherein at each of said stator pawls, one of said projections is disposed, which alternately overlap said winding groove from radially outside and from radially inside.

12. The electromechanical transducer according to claim 1, wherein said permanent magnets with north and south poles alternating in circumferential direction of said rotor are disposed in and/or on said rotor and an electrical connection polarity of windings of said stators, being on both sides of said rotor, is opposite to one another.

13. The electromechanical transducer according to claim 12, wherein said rotor is of a magnetic material and said permanent magnets in said rotor are provided by magnetization of said magnetic material.

14. The electromechanical transducer according to claim 1, wherein said stators are segmented in a circumferential direction of the electromechanical transducer.

15. The electromechanical transducer according to claim 1, wherein:
   said radially inner supporting bars of said stator form a hollow shaft around the rotation axis of said rotor;
   said rotor has an annular inner hole formed therein which corresponds to a size of an inner hollow space of said stator; and
   an inner hollow space of the electromechanical transducer is used as a housing for a drive and/or a brake device or for a cable feed and/or a work piece feed.

* * * * *